United States Patent

[11] 3,589,102

| [72] | Inventor | Seymour Zelnick<br>Orange, N.J. |
|------|----------|----------------------------------|
| [21] | Appl. No.| 783,446 |
| [22] | Filed    | Nov. 5, 1968 |
| [45] | Patented | June 29, 1971 |
| [73] | Assignee | Weldotron Corporation<br>Newark, N.J. |

[54] ROTARY METHOD AND APPARATUS FOR WRAPPING A PALLET LOAD
8 Claims, 10 Drawing Figs.

[52] U.S. Cl. ............................................... 53/184, 53/211
[51] Int. Cl. ............................................. B65b 53/06
[50] Field of Search ................................ 53/30, 189, 212, 211

[56] References Cited
UNITED STATES PATENTS

| 2,878,628 | 3/1959 | Curry | 53/184 X |
| 3,060,655 | 10/1962 | Dreyfus | 53/30 |
| 3,075,330 | 1/1963 | Swezey | 53/30 X |
| 3,200,561 | 8/1965 | Siegel et al. | 53/30 X |
| 3,324,625 | 6/1967 | Dulmage | 53/30 X |
| 3,412,524 | 11/1968 | Nestell et al. | 53/212 |
| 3,439,587 | 4/1969 | Sternau | 53/30 X |
| 3,514,920 | 6/1970 | Hoffler et al. | 53/184 X |

Primary Examiner—Theron E. Condon
Assistant Examiner—E. F. Desmond
Attorney—Harry Cohen ABSTRACT: Apparatus for shrink wrapping an object comprises a rotary platform for rotating an object wrapped in a heat-shrinkable film and heat-shrinking apparatus for heat shrinking the film around the object during rotation of the rotary platform. The heat is provided as hot air blown on the object in vertically and horizontally extending lines.

INVENTOR
SEYMOUR ZELNICK

INVENTOR.
SEYMOUR ZELNICK

BY
ATTORNEY

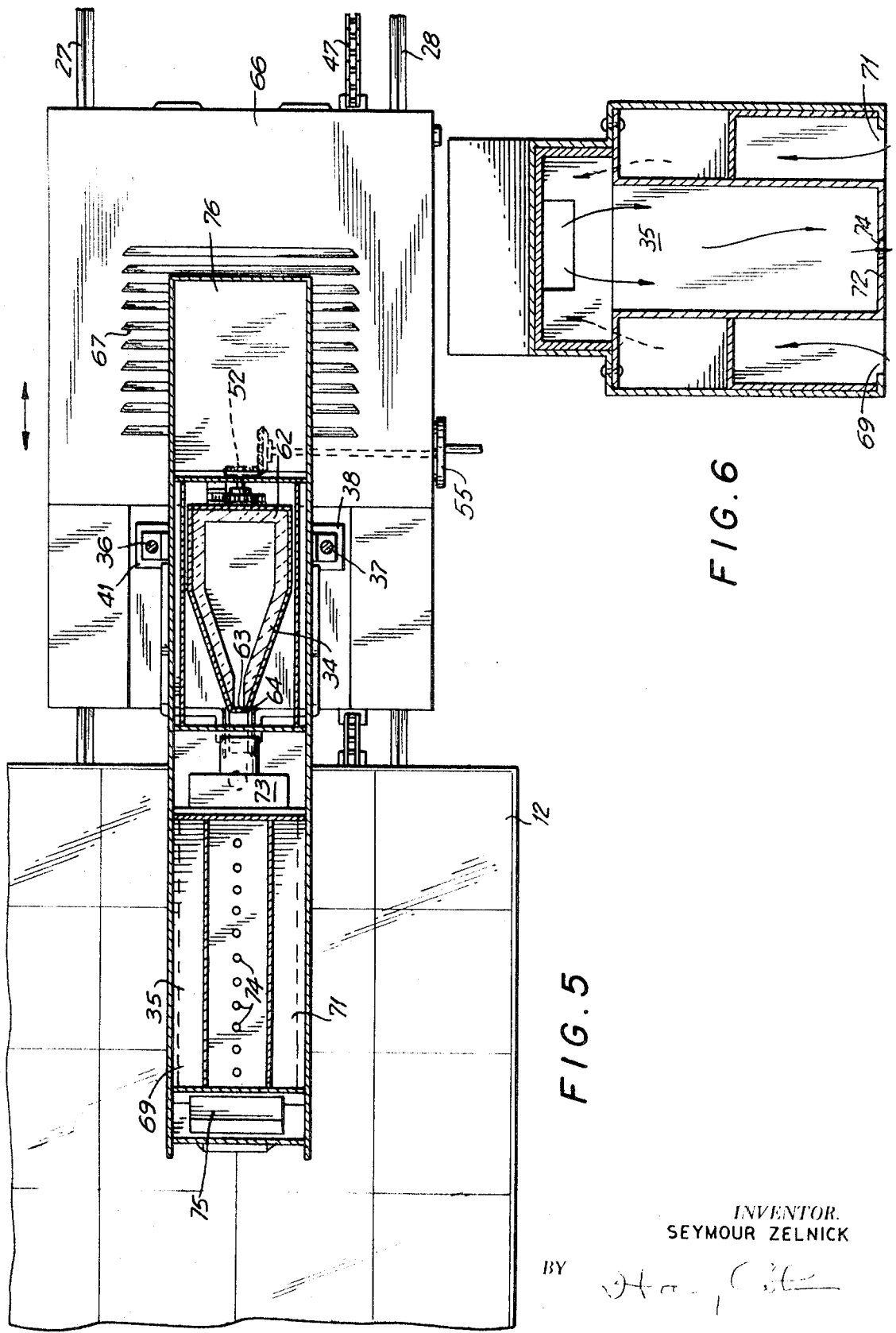

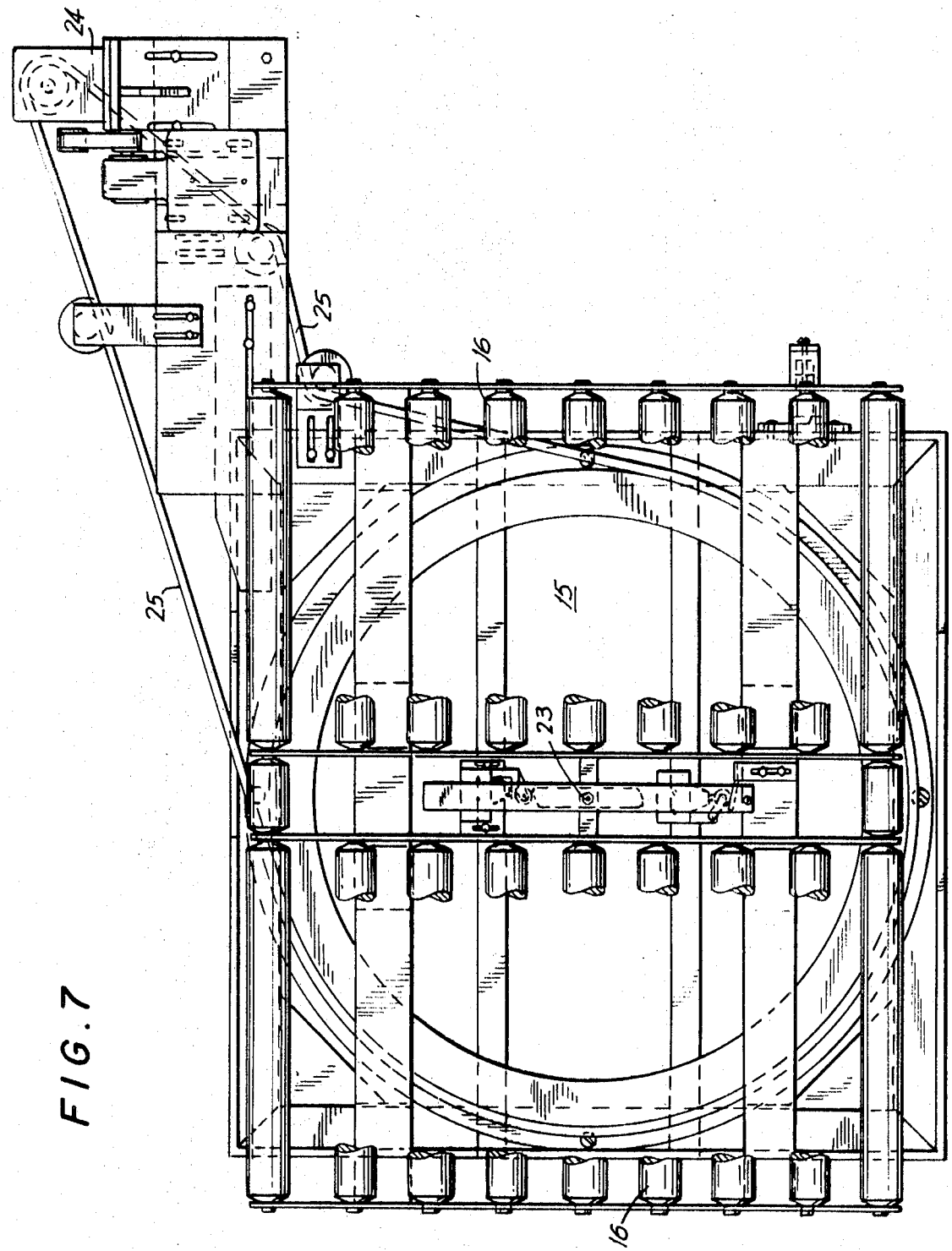

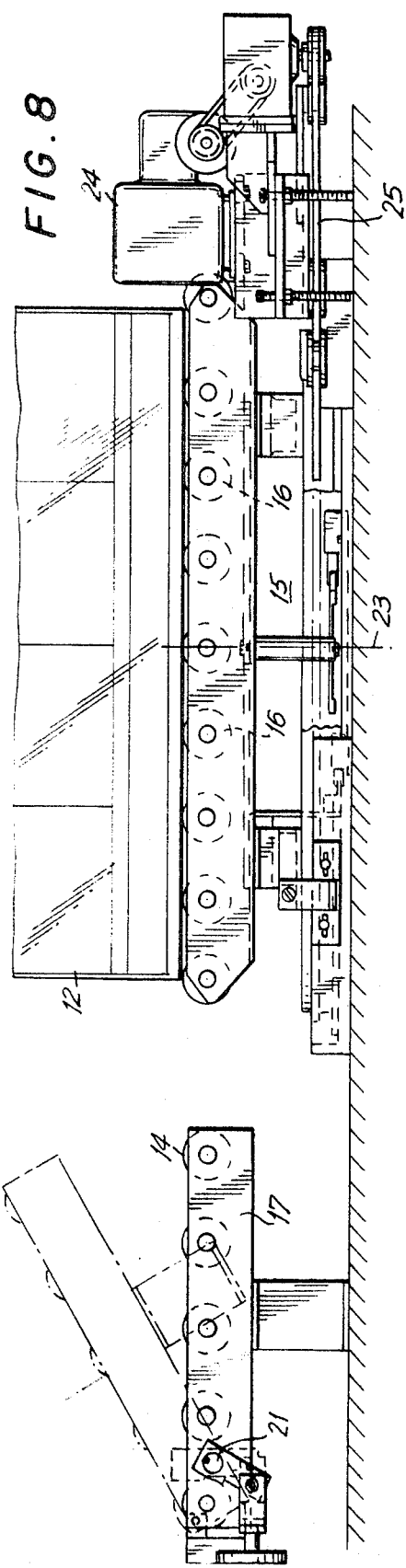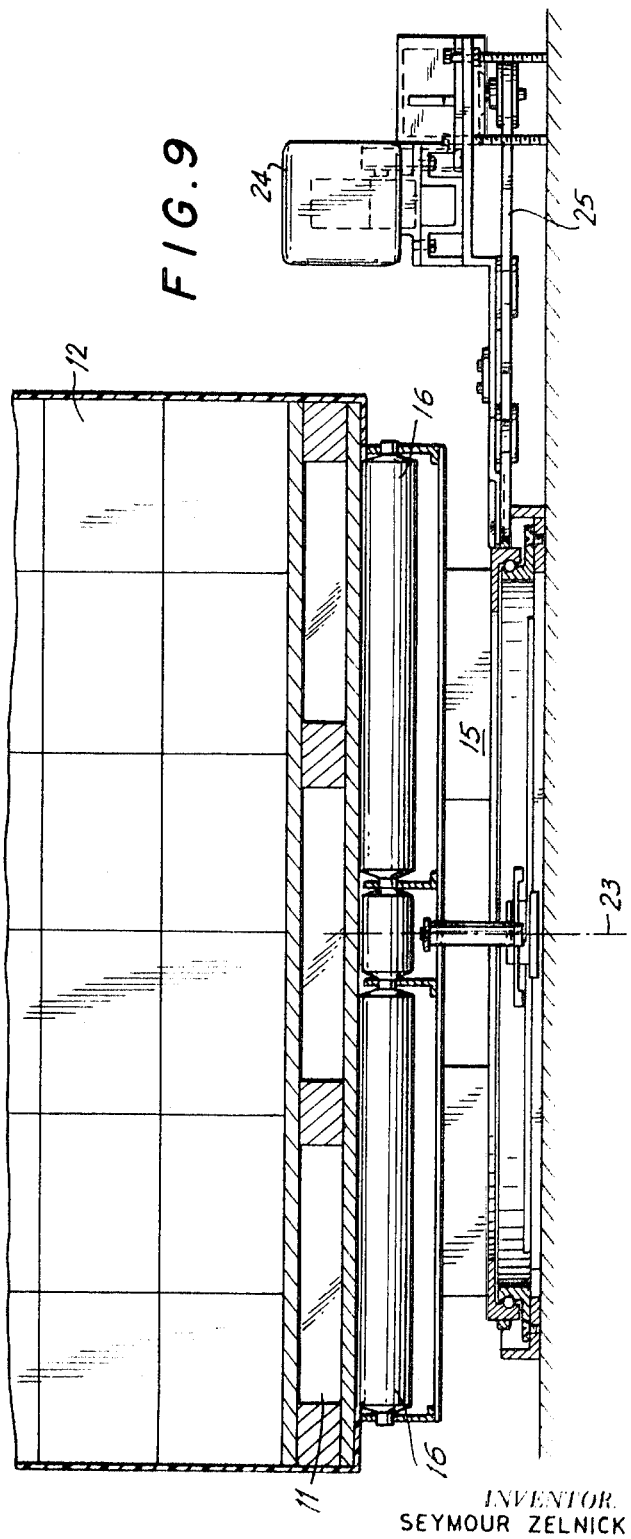

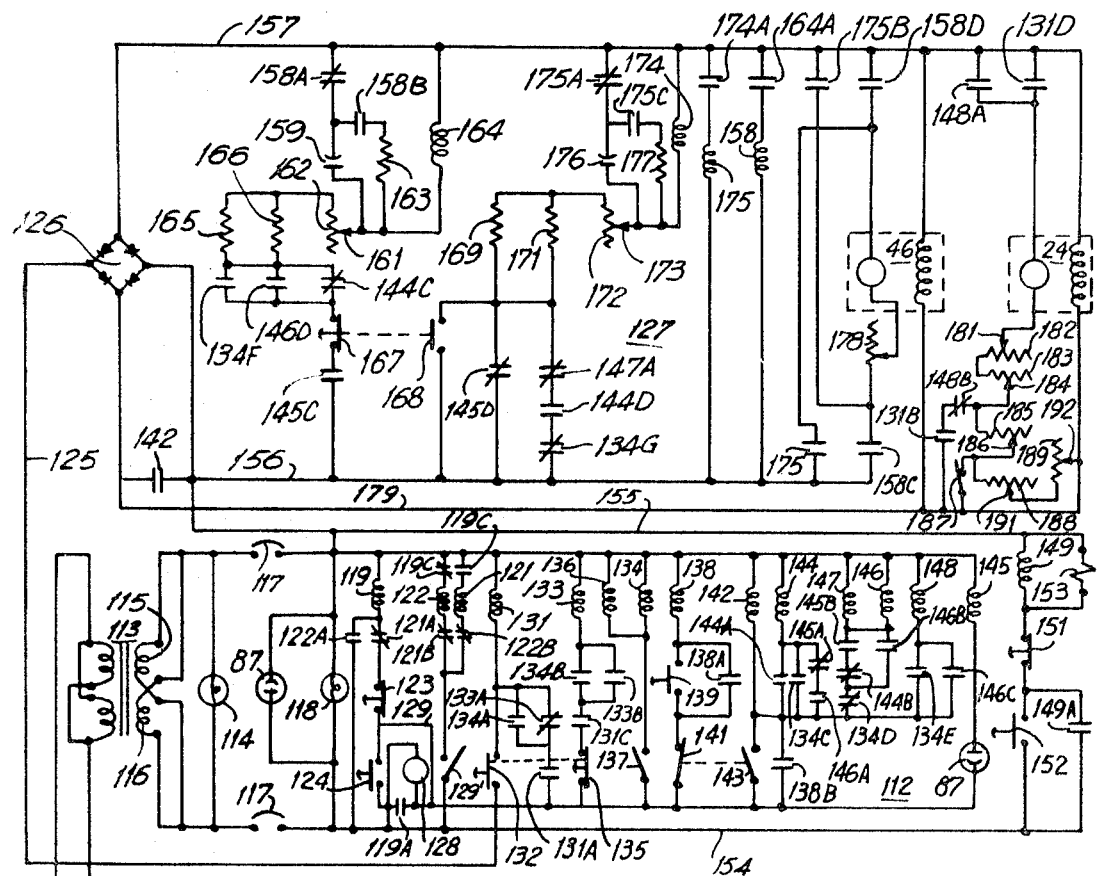
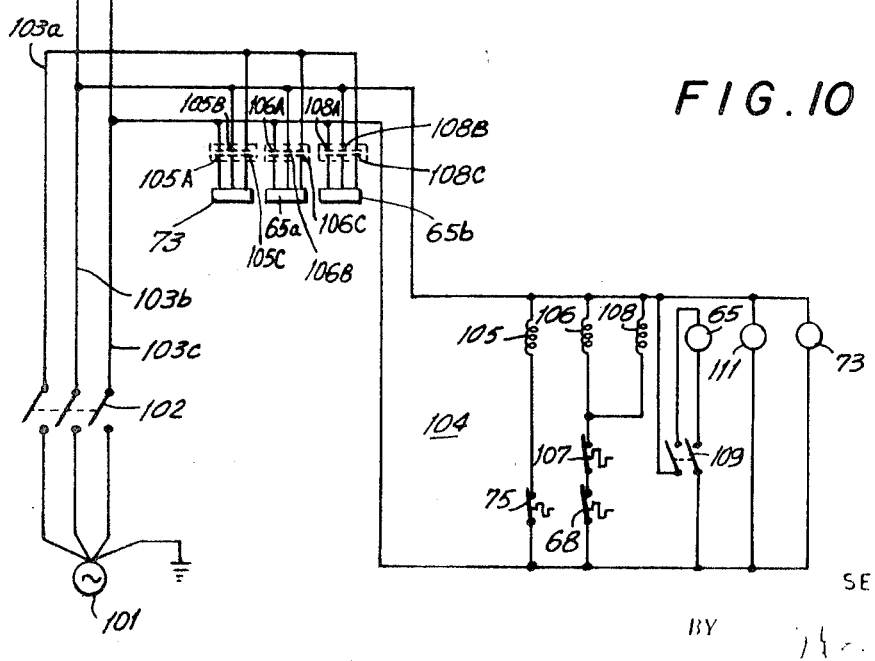
FIG. 10
INVENTOR
SEYMOUR ZELNICK
BY
ATTORNEY

ROTARY METHOD AND APPARATUS FOR WRAPPING A PALLET LOAD

DESCRIPTION OF THE INVENTION

The present invention relates to a method and apparatus for wrapping a pallet load. More particularly, the invention relates to a rotary method and apparatus for forming a tight sleeve of film around a pallet load.

The packaging of articles in thermoplastic film is well known. The film is heat shrinkable, is initially sealed around an article or articles, and is subsequently heated to shrink the film tightly about the article or articles. The film may be initially wrapped around the article manually such as, for example, disclosed in U.S. Pat No. 3,047,991, issued Aug. 7, 1962 to Siegel et al., or automatically such as, for example, U.S. Pat. No. 3,222,800, issued Dec. 14, 1965 to Siegel et al. U.S. Pat. application Ser. No. 706,601, filed Feb. 19, 1968 by S. Zelnick discloses a method and apparatus for shrink film wrapping a pallet load in which an article or group of articles on a pallet is wrapped in a vertical sleeve of heat-shrinkable thermoplastic film which is subsequently shrunk so that the entire pallet load is unitized, stabilized and protected against environmental conditions. The length of the vertical sleeve of film which is initially formed around the pallet load prior to the shrinking of the film is considerably longer tan than the vertical height of the pallet load in order to provide sufficient film, on shrinking, for overlapping the peripheral margins of the top surface of the pallet load.

U.S. Pat. application Ser. No. 735,366, filed June 7, 1968 by S. Zelnick discloses a pallet load of articles secured by a sleeve of heat-shrinkable film formed around the pallet load with its open top extending above the pallet load and its open bottom extending below the platform of the pallet. An auxiliary web of relatively high shrink energy film is secured to the sleeve diametrically above the load and an additional auxiliary web of relative high shrink energy film is secured to the sleeve diametrically below the platform.

A U.S. Pat. application Ser. No. 765,302 filed Oct. 7, 1968 by S. Zelnick et al. discloses a pallet load of articles secured by a sleeve of heat-shrinkable film formed around the pallet load with its open top extending above the pallet load and its open bottom extending below the platform of the pallet. One or both of the top and bottom surfaces of the pallet load are covered with a sheet of heat-shrinkable film having a portion extending beyond the corresponding surface. The sheet or sheets and the sleeve are shrunk and fused around the pallet load.

The wrapping of pallet loads of articles or products in shrinkable film and then shrinking such film, as described in most of the aforedescribed patents and patent applications, is rapidly gaining acceptance as a means of improving stability and protection of the pallet load. The shrink tunnel is the preferred shrinking device when production requirements are medium to high. When production requirements are low and space is limited, however, it is necessary that the shrinking device occupy less floorspace than the shrink tunnel and be basically less expensive than the shrink tunnel. The shrink tunnel occupies considerable space and is expensive in manufacture.

The principal object of the present invention is to provide a new and improved method and apparatus for wrapping a pallet load.

An object of the invention is to provide a method and apparatus for wrapping a pallet load, which method and apparatus overcome the disadvantages of known methods and apparatus.

An object of the present invention is to provide a method and apparatus for wrapping a pallet load, which apparatus occupies little floor space and is inexpensive to manufacture.

An object of the present invention is to provide apparatus for wrapping a pallet load, which apparatus is efficient, effective and reliable in operation.

An object of the present invention is to provide a method and apparatus for wrapping a pallet load automatically and with rapidity.

In accordance with the present invention, apparatus for shrink wrapping an object comprises rotary platform means for rotating an object wrapped in a heat-shrinkable film and shrinking means for heat shrinking the film around the object during rotation of the rotary platform means.

In accordance with the present invention, apparatus for wrapping an object comprises conveyor means for transporting an object. The conveyor means has a space formed therein dividing the conveyor means into two parts each having an edge bordering the space. Rotary platform means is rotatably mounted in the space between the two conveyor parts for axial rotation in a plane substantially coplanar with the plane of the conveyor means. The rotary platform means is positioned for transfer of the object from one of the two conveyor parts to the rotary platform means and for transfer of the object from the rotary platform means to the other of the two conveyor parts. Wrapping means wraps a heat-shrinkable film on the object. A rotary drive coupled to the rotary platform means rotates the film-wrapped object on the rotary platform means. Shrinking means heat shrinks the film around the object during rotation of the rotary platform means.

The wrapping means may comprise a roll of heat-shrinkable film mounted adjacent the rotary platform means for wrapping the object on the rotary platform means during rotation of the rotary platform means. The shrinking means comprises vertical conduit means having a substantially vertical conduit movably mounted for movement toward and away from the rotary platform means. The vertical conduit has a plurality of outlet apertures formed therethrough extending along the vertical length thereof. Vertical heat means blows hot air out of the outlet apertures. Vertical conduit drive means coupled to the vertical conduit selectively moves the vertical conduit toward and away from the rotary platform means. The shrinking means further comprises horizontal conduit means having a substantially horizontal conduit movably mounted for movement upward and downward relative to the object on the rotary platform means. The horizontal conduit has a plurality of outlet apertures formed therethrough extending along a horizontal length thereof. Horizontal heat means blows hot air out of the outlet apertures. Horizontal conduit drive means coupled to the horizontal conduit selectively moves the horizontal conduit upward and downward.

A first bridge member pivotally affixed to the edge of one of the parts of the conveyor means extends into the space. A second bridge member pivotally affixed to the edge of the other of the parts of the conveyor means extends into the around Bridge means coupled to the first and second bridge members selectively pivotally raises and lowers the first and second bridge members to permit clearance of the corners of the rotary platform means and the edges during rotation of the rotary platform means. Control means is electrically connected to the vertical conduit drive means of the vertical conduit means for deenergizing the vertical conduit drive means when the vertical conduit reaches a determined distance from the object. The object is a pallet load.

In accordance with the present invention, a method of wrapping an object comprises rotating the object, wrapping the object with a heat-shrinkable film while it is rotating, and heat shrinking the film around the object while it is rotating.

The heat shrinking of the film is accomplished by blowing hot air on the film around the object along substantially vertical and horizontal lines while the object is rotated.

In order that the present invention may be readily carried into effect it will now be described with reference to the accompanying drawings, wherein:

FIG. 5 is a view, partly in section, taken along the lines V-V of FIG. 2;

FIG. 6 is a sectional view, taken along the lines VI-VI of FIG. 2;

FIG. 7 is a view taken along the lines VII-VII of FIG. 1;

FIG. 8 is a view taken along the lines VIII-VIII of FIG. 1;

FIG. 9 is a view, partly in section, taken along the lines IX-IX of FIG. 1; and

FIG. 10 is a circuit diagram of an embodiment of an electrical control circuit for the apparatus of FIG. 1.

In the Figures the same components are identified by the same reference numerals.

Figure 1:
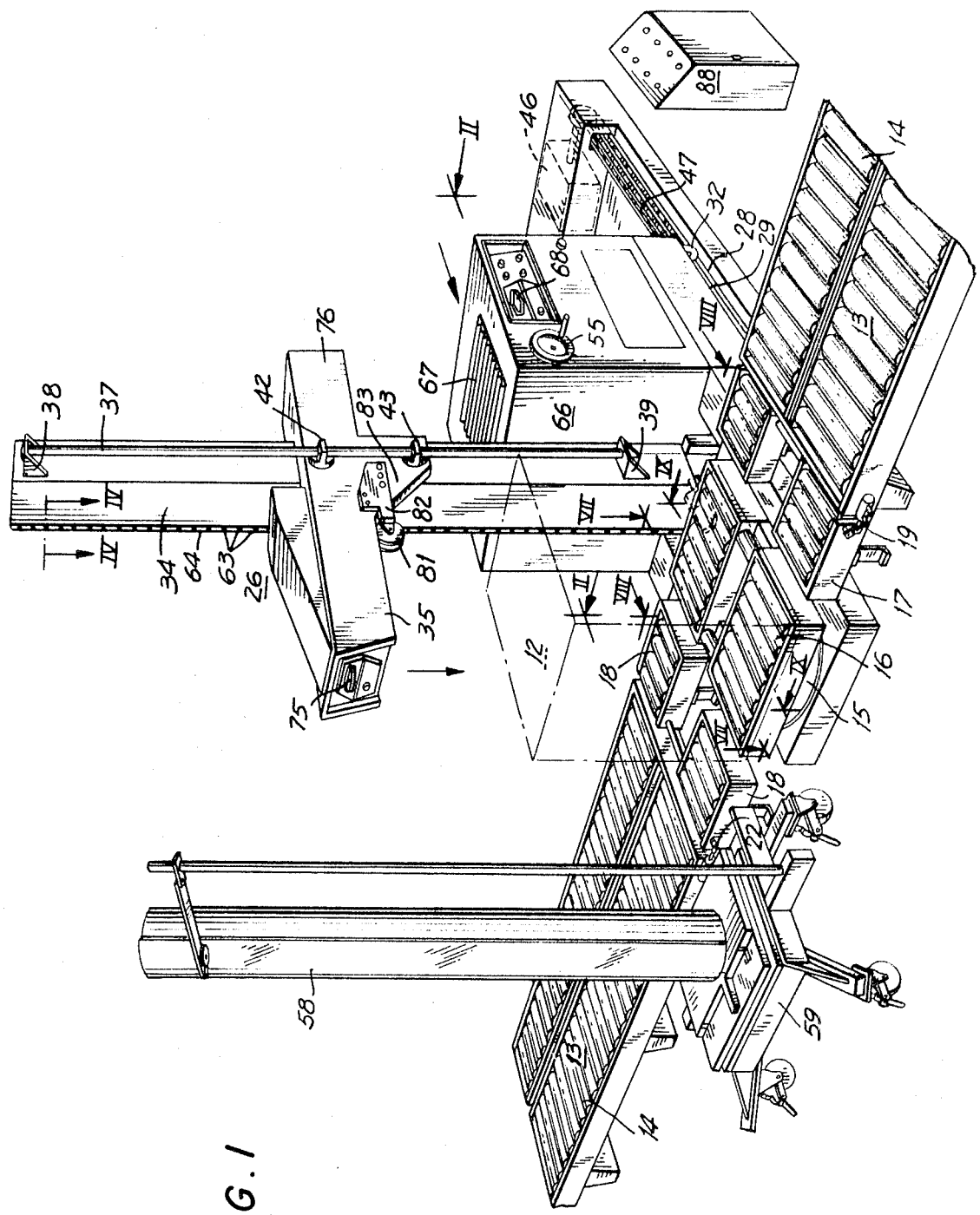
FIG. 1 is a perspective view of an embodiment of the apparatus of the present invention for wrapping a pallet load.

A pallet 11 (FIGS. 2 and 9), bearing a load of articles, products, goods, packages, boxes, or the like 12 (FIGS. 2, 5, 8 and 9), and generally indicated in broken lines in FIG. 1 as a pallet load 12, is moved into wrapping position by an infeed conveyor 13 (FIG. 1). The infeed conveyor 13 comprises a plurality of rollers 14 (FIGS. 1 and 8) rotatably mounted in adjacent or closely spaced coplanar parallel relation for conveying the pallet load 12 from a starting point somewhere at the right of left end of the conveyor 13 to the wrapping position and thence to the terminal point somewhere at the opposite end of said conveyor.

The conveyor 13 is discontinued in the area of the wrapping position of the pallet load to form a gap in said conveyor. A rotary platform, table or member 15 (FIGS. 1, 2, 7, 8 and 9) is rotatably mounted in the gap in the conveyor 13. A plurality of rollers 16 (FIGS. 1, 2, 7, 8 and 9) are rotatably mounted on the rotary platform 15 in adjacent or closely spaced coplanar parallel relation to enable the pallet load 12 to be moved from one of the ends of the conveyor 13 at the gap onto and into a central position on said rotary platform. The conveying surface plane of the rollers 16 of the rotary platform 15 is essentially coplanar with that of the rollers 14 of the conveyor 13 and the spaces between corresponding rollers 14 and 15 at the corresponding edges of said conveyor are narrow enough to facilitate transfer of the pallet load 12 to and from said rotary platform.

At one end of the conveyor 13 at the gap, a portion of said conveyor is separated from and pivotally affixed to the remainder of said conveyor to form a first rotatable bridge member 17 (FIGS. 1 and 8). At the opposite end of the conveyor 13 at the gap, a portion of said conveyor is separated from and pivotally affixed to the remainder of said conveyor to form a second rotatable bridge member 18 (FIG. 1). The first bridge member 17 is pivotally affixed to the conveyor 13 by any suitable means such as, for example, hinges, one of which, 19, is shown in FIG. 1, and the other which, 21, is shown in FIG. 8.

The hinges 19 and 21 permit the first bridge member 17 to rotate, as shown in FIG. 8 in broken lines, upward out of the conveying surface plane of the rollers 14 of the conveyor 13. The second bridge member 18 is pivotally affixed to the conveyor 13 by any suitable means such as, for example, hinges, one of which, 22, is shown in FIG. 1. The hinge 22 and the other hinge (not shown in the FIGS.) permit the second bridge member 18 to rotate in the same manner as the first bridge member 17, upward out of the conveying surface plane of the rollers 14 of the conveyor 13.

When the first and second bridge members 17 and 18 are rotated out of the conveying surface plane of the rollers 14 of the conveyor 13 they function as a drawbridge to clear a large space around the rotary platform 15, thereby providing sufficient room for said platform and a pallet load thereon to rotate 360° about its axis without abutting said conveyor. If the rotary platform 15 were not utilized, sufficient gaps would have to be provided between the corresponding edges of said rotary platform and the conveyor 13 to enable 360° rotation of said rotary platform about its axis without obstruction. The wider the gaps, the larger the base dimensions of the minimum-sized pallet load which may be wrapped by the apparatus of the present invention.

The rotary platform 15 may be rotated about its axis 23 (FIGS. 7, 8 and 9) by any suitable means such as, for example, that shown in FIGS. 7, 8 and 9. In FIGS. 7, 8 and 9, a rotary drive motor 24 rotates the rotary platform 15 about its axis 23 via any suitable coupling such as, for example, a drive belt 25. The drive belt 25 is suitably mounted on various wheels, rollers and the like (FIG. 7) to provide suitable tension in said drive belt and to suitably rotate the rotary platform 15 by the rotary drive motor 24.

Figure 2:
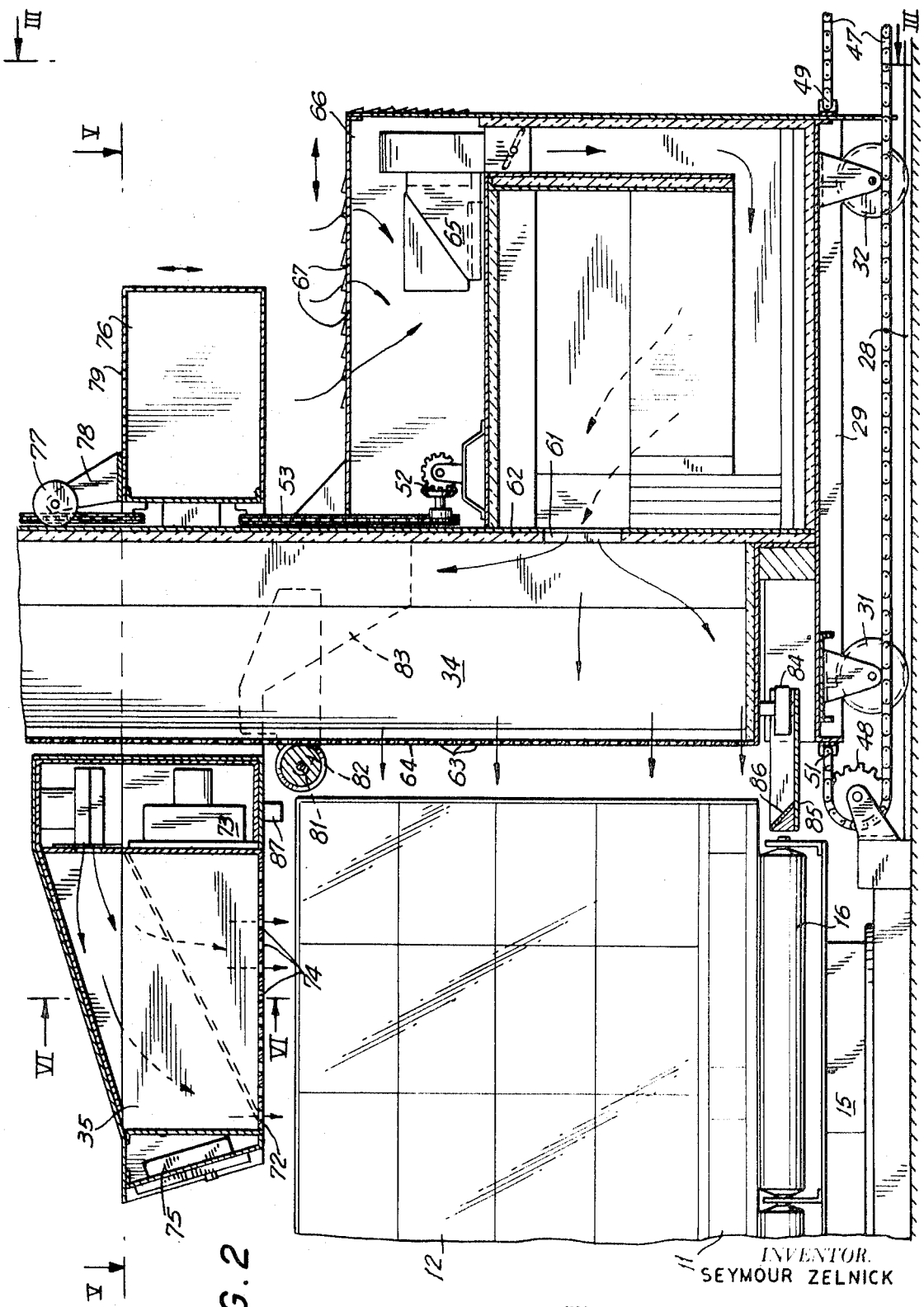
FIG. 2 is a view, partly in section, taken along the lines II–II of FIG. 1.
Figures 3, 4:
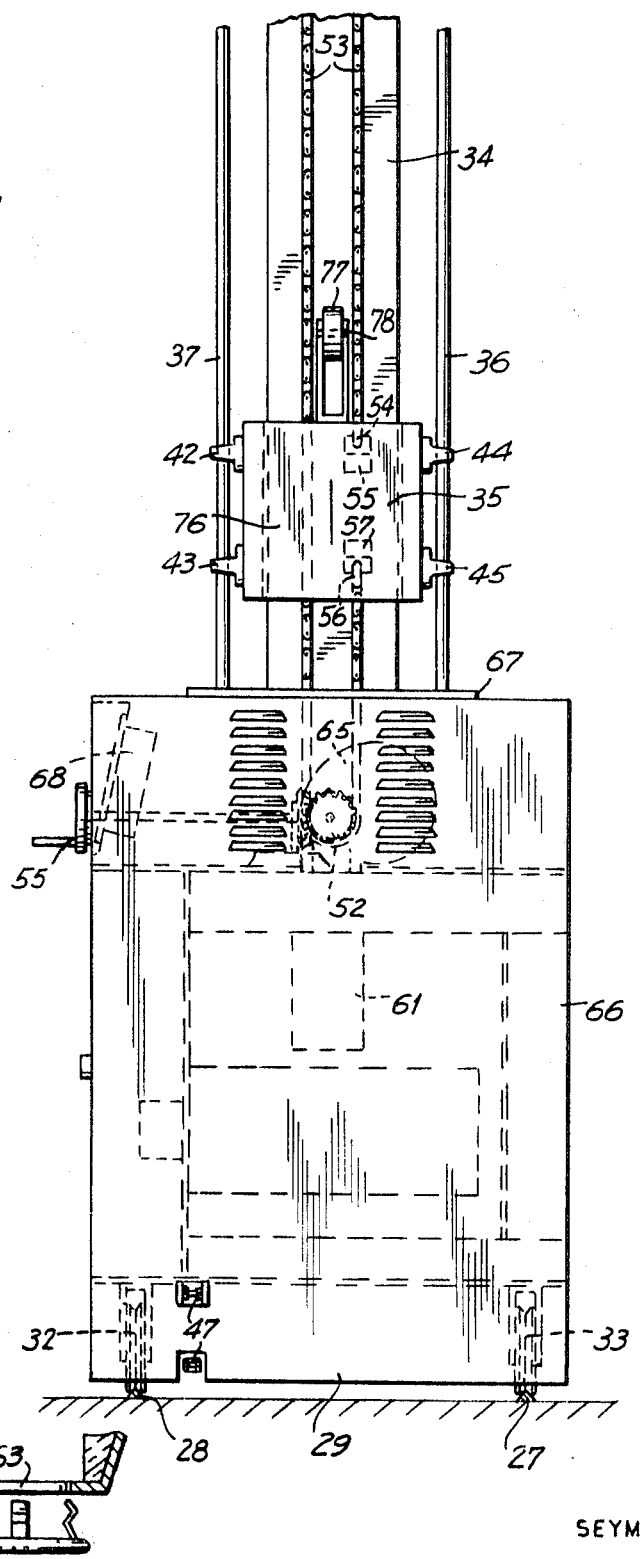
FIG. 3 is a rear view, taken along the lines III–III of FIG. 2.
FIG. 4 is a view, partly in section, taken along the lines IV-IV of FIG. 1.

A movable hot-air generator 26 (FIGS. 1 to 6) is movably mounted on a pair of rails 27 and 28 (FIGS. 3 and 5) by any suitable means such as, for example, a wheeled truck 29 (FIGS. 2 and 3). The truck 29 is supported by a plurality of wheels, of which the wheels 31 and 32 are shown in FIG. 2 and the wheels 32 and 33 are shown in FIG. 3. The wheels are suitably grooved, notched or flanged so that they remain on their corresponding rails and rotate freely thereon, the wheels 31 and 32 rotating on and being guided by the rail 28 and the wheel 33 being guided by and rotating on the rail 27.

The hot-air generator 26 comprises a vertical conduit 34 (FIGS. 1, 2, 3 and 5) supported on the wheeled truck 29 and a horizontal conduit 35 (FIGS. 1 to 6). The horizontal conduit 35 is movably mounted on the wheeled truck 29 for free upward or downward motion by any suitable means. Thus, a pair of parallel, spaced, vertically extending guide bars 36 and 37 (FIGS. 1, 3 and 5) are affixed to opposite sides of the vertical conduit 34 by any suitable means such as, for example, brackets, of which the brackets 38 and 39 are shown in FIG. 1 and the brackets 38 and 41 are shown in FIG. 5. A pair of spaced parallel rings 42 and 43 (FIGS. 1 and 3) are affixed to one side of the horizontal conduit 35 and are seated on and guided by the guide bar 37. A pair of spaced parallel rings 44 and 45 (FIGS. 3) are affixed to the opposite side of the horizontal conduit 35 and are seated on the guided by the guide bar 36.

The wheeled truck 29, and therefore the vertical and horizontal conduits 34 and 35 mounted thereon, and moved backwards and forwards along the rails 27 and 28 by any suitable means such as, for example, a vertical conduit drive motor 46 (FIG. 1). The vertical conduit drive motor 46 is coupled to the wheeled truck 29 by any suitable coupling means such as, for example, a drive chain 47 (FIGS. 1, 2, 3 and 5). The drive chain 47 is an endless chain anchored at one point adjacent the rotary platform 15 by a gear 48 (FIG. 2) and driven at the opposite point by the vertical conduit drive motor 46. The drive chain 47 is affixed at one end 49 to the corresponding end of the wheeled truck 29 by any suitable means and is affixed at its other end 51 to the corresponding end of said wheeled truck (FIG. 2).

The horizontal conduit 35 is moved upward and downward along the guide bars 36 and 37 by any suitable means such as for example, a gear 52 coupled in any suitable way to an operating handle 55 (FIGS. 1 and 3). The gear 52 is coupled to the horizontal conduit 35 by any suitable coupling means such as, for example, a conduit chain 53 (FIGS. 2 and 3). The conduit chain 53 is an endless chain anchored at one point adjacent the top of the vertical conduit 34 by any suitable means (not shown in the FIGS.) such as, for example, the device utilized to anchor the drive chain 47. The conduit chain 53 is affixed at one end 54 to a point 55 on a side of the horizontal conduit 35 and is affixed at its other end 56 to a point 57 on said side of said horizontal conduit (FIG. 3).

The pallet load 12 may be transferred to the rotary platform 15 from the conveyor 13, may be placed on said rotary platform by a forklift truck, crane or hand, or may be built up on said rotary platform. Shrinkable film may be applied to cover the pallet load 12 in the form of a bag or may be wrapped around said pallet load by any suitable apparatus and method such as, for example, those disclosed n copending patent application Ser. No. 735,366 and in the last-filed copending patent application. Thus, a roll 58 of heat shrinkable film (FIG. 1) such as, for example, a polyethylene, may be vertically mounted on a movable wheeled base 59 (FIG. 1).

The leading edge of the film on the roll 58 is taped to the pallet load 12 on the rotary platform 15. The first and second bridge members 17 and 18 are raised and the rotary platform 15 is rotated about its axis. After one revolution, the film is completely wrapped around the pallet load 12. After the film is completely wrapped around the pallet load 12 it is severed from the roll 58 and the tack is sealed. The shrinking operation is then initiated to shrink the film around the pallet load 12.

The vertical conduit 34 has an inlet aperture 61 (FIG. 2) formed through its rear wall 62 in the lower area thereof and a plurality of spaced outlet apertures 63 formed through its front wall 64 along the entire length thereof (FIGS. 1, 2, 4 and 5). As shown in FIG. 5, the vertical conduit 34 is tapered from about the center of its cross-sectional area to its front wall 64, so that said front wall is considerably narrower than the rear wall 62. A vertical hot-air blower (FIG. 2) of any suitable type is mounted in a vented housing 66 (FIGS. 1, 2, 3 and 5) adjacent the rear wall 62 of the vertical conduit 34 on the wheeled truck 29.

The vertical hot-air blower 65 draws air into the housing 66 via a plurality of air vents 67 (FIGS. 1, 2, 3 and 5), as shown by the arrows in FIG. 2, and heats such air. The air heated by the vertical hot-air blower 65 is blown through the housing 66, as shown by the arrows in FIG. 2, into the vertical conduit 34, and out through the outlet apertures 63 of said vertical conduit, as shown by the arrows in FIG. 2. The vertical hot-air blower 65 is controlled by a vertical heat control thermostat 68 (FIGS. 1 and 3) mounted on the housing 66.

The horizontal conduit 35 has inlet apertures 69 and 71 (FIGS. 5 and 6) formed through its bottom wall 72 (FIGS. 2 and 6) in the part of said horizontal conduit which extends forward of the front wall 64 of the vertical conduit 34. As shown in FIG. 6, the horizontal conduit 35 has a rectangular cross-sectional area. A horizontal hot-air blower 73 (FIGS. 2 and 5) of any suitable type is mounted in the horizontal conduit 35 close to the front wall 64 of the vertical conduit 34. The horizontal hot-air blower 73 draws air into the horizontal conduit 35 via the inlet apertures 69 and 71 thereof, as shown by the upward directed arrows in FIG. 6, and heats such air.

The air heated by the horizontal hot-air blower 73 is blown through the horizontal conduit 35, as shown by the arrows in FIG. 2 and the downward directed arrows in FIG. 6, and out through a plurality of spaced outlet apertures 74 FIGS. 2, 5 and 6) formed through its bottom wall 72 along the entire length thereof extending forward of the front wall 64 of the vertical conduit 34, as shown by the broken arrows in FIG. 2 and the arrow in FIG. 6. The horizontal hot-air blower 73 is controlled by a horizontal heat control thermostat 75 (FIGS. 1, 2 and 5) mounted on the horizontal conduit 35.

The horizontal conduit 35 has a part 76 (FIGS. 1, 2, 3 and 5) which extends behind the rear wall 62 of the vertical conduit 34. A first stabilizing roller 77 is rotatably mounted on an arm 78 extending upward from the top wall 79 of the part 76 of the horizontal conduit 35 (FIGS. 2 and 3) and abuts and rolls on the rear wall 62 of the vertical conduit 34. A second stabilizing roller 81 is rotatably mounted on arms 82 extending forward from lower extending parts 83 of the horizontal conduit 35 (FIGS. 1 and 2) and abuts and rolls on the front wall 64 of the vertical conduit 34. The peripheral area of the roller 81 is notched, grooved, or channelled so that it is guided by the front wall 64 of the vertical conduit 34.

A source of light 84 (FIG. 1) is mounted on the wheeled truck 29 at one end of a light tube 85 (FIG. 1). A light reflector or mirror 86 (FIG. 1) is mounted at the other end of the light tube 85 which extends a determined distance forward of the wheeled truck 29. A photocell or photosensitive device 87 (FIG. 2) is mounted on the bottom wall 72 of the horizontal conduit 35 in the vertical beam of light produced by the light source 84 and the light reflector 86. When the vertical conduit 34, and therefore the horizontal conduit 35 mounted thereon, has reached its operating position, as shown in FIGS. 1 and 2, the pallet load 12 intercepts the light beam from the light tube 85 and thereby prevents said light beam from impinging upon the photosensitive device 87.

The vertical conduit 34 is moved along the rails 27 and 28 on the wheeled truck 29 toward the end of said rails adjacent the rotary platform 15 by the vertical conduit drive motor 46. When the vertical conduit 34 reaches a determined distance, of, for example, 2 inches, from the pallet load 12, said pallet load interrupts the light beam from the light tube 85 impinging upon the photosensitive device 87. When the light beam is blocked from the photosensitive device 87 by the pallet load 12, the first and second bridge members 17 and 18 are rotated upward, the rotary drive motor 24 is energized and rotates the rotary platform 15 and the horizontal conduit drive gear 52 is actuated and moves the horizontal conduit 35 downward to a determined distance from the top surface of said pallet load. The determined distance from the top surface of the pallet load 12 may be determined by any suitable means such as, for example, a sensing arm extending downward from the bottom surface 72 of the horizontal conduit 35 (not shown in the FIGS.).

The vertical and horizontal hot-air blowers 65 and 73 are energized and heat the film covering the pallet load 12 as it is rotated on the rotary platform 15. After one complete revolution, the rotary platform 15 is stopped by the deenergization of the rotary drive motor 24, the vertical and horizontal hot-air blowers 65 and 73 are deenergized, the vertical conduit drive motor 46 is energized in the reverse sense and moves the vertical conduit 34 to the end of the rails 27 and 28 farthest from said rotary platform, and the first and second bridge members 17 and 18 are lowered.

FIG. 10 is a control circuit for the pallet load wrapping apparatus of the present invention and may be housed in a console 88 (FIG. 1) to enable remote control of said apparatus. In FIG. 10, electrical energy is provided by a source of AC voltage 101 which provides, for example, three phase AC of 240 volts at 60 cycles per second. A main switch 102 connects the circuit to the AC source 101.

The heater part of the horizontal hot-air blower or heater 73 and a pair of heater parts of the vertical hot-air blowers or heaters 65a and 65b, hereinbefore described as the vertical hot-air blower 65, are each connected across the three phase lines 103a, 103b and 103c from the AC source 101. A hot air blower control circuit 104 is connected between the phase lines 103b and 103c. The hot-air blower control circuit 104 comprises a relay 105 winding connected in series with the horizontal heat control thermostat 75. The relay 105 functions to control the horizontal hot-air blower 73 via its contacts 105A, 105B and 105C.

A relay 106 winding is connected in series with the vertical heat control thermostat 68 and a thermostat 107 which functions as a safety thermostat. The series connection 106, 68. 107 is connected in parallel with the series connection 105, 75. A relay 108 winding is connected in shunt across the relay winding 106. The relays 106 and 108 function to control the vertical hot-air blowers 65a and 65b via their contacts 106A, 106B and 106C and 108A, 108B and 108C. The blower part of the vertical hot-air blower or blower 65 is connected in series with a motor start switch 109. The series connection 65, 109 is connected in parallel with the series connections 105, 75 and 106, 107, 68. An auxiliary blower 111 is connected in parallel with the series connection 65, 109 and functions to cool parts of the apparatus. The blower part of the horizontal hot-air blower or blower 73 is connected in parallel with the auxiliary blower 111.

An AC control circuit 112 is coupled to the phase lines 103b and 103c via an input transformer 113. A lamp 114, which is preferably red, is connected across the secondary windings 115 and 116 of the input transformer 113. A circuit breaker 117 is connected in the main lines of the AC control circuit 112 to open the entire AC control circuit, if necessary. A lamp 118, which is preferably red, is connected in parallel with the lamp 114 on the other side of the circuit breaker 117 from the lamp 114. The photosensitive device 87 is connected in shunt with the lamp 118.

A relay 119 winding is connected in series with normally closed contacts 121A of a relay 121 winding, a pushbutton switch 123 and a pushbutton switch 124. Normally open contacts 122A of a relay 122 winding are connected in shunt with the contacts 121A, the pushbutton switch 123 and the pushbutton switch 124. The series connections 119, 122A and 119, 121A, 123 124 are connected in parallel with the lamp 118. Normally open contacts 119A of the relay 119 are connected in the line 125 between the pushbutton switch 124 and an input terminal of a rectifier 126 at the input of a DC control circuit 127 for controlling the drive motor of the apparatus.

A lamp 128, which is preferably amber, is connected across the contacts 119A. A line 129 is connected as a short circuit across the series-connected pushbutton switch 124 and the contacts 119A. Normally open contacts 119B of the relay 119 is connected in series with the relay 122 winding, normally closed contacts 121B of the relay 121 and a switch 129. Normally open contacts 119C of the relay 119 are connected in series with the relay 121 winding and normally closed contacts 122B of the relay 122. The series connection 119B, 122, 121B and the series connection 119C, 121, 122B are connected in parallel with each other and each is connected in series with the switch 129'.

A relay 131 winding is connected in series with a pushbutton switch 132. Normally closed contacts 133A of a relay 133 are connected in series with normally open contacts 131A of the relay 131 and the series connection 133A, 131A is connected across the pushbutton switch 132. Normally open contacts 134A of a relay 134 are connected across the contacts 133A. The relay 133 winding is connected in series with normally open contacts 134B of the relay 134, normally open contacts 131C of the relay 131 and pushbutton switch 135 coupled to the pushbutton switch 122. Normally open contacts 133B of the relay 133 are connected in shunt with the contacts 134B. The relay winding 134 and a relay winding 136 are connected in parallel and the parallel connection 134, 136 is connected in series with a switch 137.

A relay 138 winding is connected in series with a pushbutton switch 139 and a switch 141. Normally open contacts 138A of the relay 138 are connected in parallel with the pushbutton switch 139. A relay 142 winding is connected in series with a switch 143 coupled to the switch 141. A relay 144 winding is connected in series with normally open contacts 144A of said relay and normally open contacts 138B of the relay 138. Normally open contacts 134C of the relay 134 are connected in parallel with the contacts 144A. Normally closed contacts 145A of a relay 145 winding are connected in series with normally open contacts 146A of a relay 146 winding and the series connection 145A, 146A is connected in parallel with the contacts 144A and with the contacts 134C.

A relay 147 winding is connected in series with normally open contacts 145B of the relay 145, normally closed contacts 144B of the relay 144, normally closed contacts 134D of the relay 134 and the contacts 138B. The relay 146 winding is connected in parallel with the relay 147 winding and in series with normally open contacts 146B of the relay 146. The contacts 146B are connected across the series connection of the contacts 145B and 144B. A relay 148 winding is connected in series with normally open contacts 134E of the relay 134 and the contacts 138B. Normally open contacts 146C of the relay 146 are connected across the contacts 134E.

The relay 145 winding is connected in series with the photosensitive device 87; the series connection 145, 87 being connected in parallel with the series connection 144, 144A, 138B. A relay 149 winding is connected in series with a pushbutton switch 151 and a pushbutton switch 152. A solenoid 153 is connected across the relay 149 winding. Normally open contacts 149A of the relay 149 are connected across the pushbutton 152. The series connection 149, 151, 152 is connected in parallel with the lamp 118 via lines 154 and 155. The lead 155 connects the AC control circuit 112 to the other input terminal of the rectifier 126 of the DC control circuit 127.

The DC control circuit 127 is connected across the output terminals of the rectifier 126 via lines 156 and 157. Normally open contacts 142A of the relay 142 of the AC control circuit 112 are connected in the line 156 between the rectifier 126 and the rest of the DC control circuit 127. Normally closed contacts 158A of a relay 158 are connected in series with a capacitor 159 to the movable contact 161 of a variable resistor 162. Normally open contacts 158B of the relay 158 are connected in series with a resistor 163 across the capacitor 159. A relay 164 winding is connected across the series connection 158A, 159 and is connected in series with the movable contact 161 of the variable resistor 162.

The variable resistor 162 is connected to one of normally closed contacts 144C via resistors 165 and 166 which are connected in parallel with each other. The resistor 165 is connected in series with normally closed contacts 134F of the relay 134. The resistor 166 is connected in series with normally open contacts 146D of the relay 146. The contacts 134F and 146D are connected in parallel with the contacts 144C. The other of the contacts 144C is connected in series with pushbutton switch 167 and normally open contacts 145C of the relay 145.

A pushbutton switch 168, coupled to the pushbutton switch 167, is connected in parallel with normally closed contacts 145D of the relay 145. Normally closed contacts 147A of the relay 147 are connected in series with normally open contacts 144D of the relay 144 and normally closed contacts 134G of the relay 134, and the series connection 147A, 144D, 134G is connected in parallel with the contacts 145D and with the pushbutton switch 168. REsistors 169 and 171 are connected in parallel with each other. The resistor 169 is connected in series with the contacts 145D and the resistor 171 is connected in series with the series connection 147A, 144D, 134G. A variable resistor 172 is connected to the resistors 169 and 171 and has a movable contact 173.

The movable contact 173 of the variable resistor 172 is connected to a relay 174 winding. Normally closed contacts 175A of a relay 175 are connected in series with a capacitor 176 and the series connection 175A, 176 is connected in parallel with the relay 174 winding. Normally open contacts 175C of the relay 175 are connected in series with a resistor 177, and the series connection 175C, 177 is connected across the capacitor 176. The relay 175 winding is connected in series with normally open contacts 174A of the relay 174.

The relay 158 winding is connected in series with normally open contacts 164A of the relay 164. Normally open contacts 175B of the relay 175 are connected in series with normally open contacts 158C of the relay 158. Normally open contacts 158D of the relay 158 are connected in series with normally open contacts 175D of the relay 175. The armature circuit of the vertical conduit drive motor 46 is connected in series with a variable resistor 178 between the contacts 158D and 158C, as well as between the contacts 175D and 175B. The field winding of the vertical conduit drive motor 46 connected across the output terminals of the rectifier 126 via the lead 157 and a line 179.

The field winding of the rotary drive motor 24 is connected in parallel with the field winding of the vertical conduit drive motor 46 via the lines 157 and 179. One terminal of the armature circuit of the rotary drive motor 24 is connected to the line 157 via normally open contacts 131D of the relay 131 and normally open contacts 148A of the relay 148 connected in parallel with the contacts 131D. The other terminal of the armature circuit of the rotary drive motor 24 is connected to the movable contact 181 of a variable resistor 182. A variable resistor 183 is connected in series with the variable resistor 182. The movable contact 184 of the variable resistor 183 is connected in series with normally closed contacts 148B of the relay 148 and normally open contacts 131B of the relay 131 to the line 179.

The movable contact 184 of the variable resistor 183 is connected in series with a variable resistor 185. The movable contact 186 of the variable resistor 185 is connected to the line 179 via a switch 187 and to said line via a variable resistor 188 and a variable resistor 189. The movable contact 186 of the variable resistor 185 is connected to the variable resistor 188. The movable contact 191 of the variable resistor 188 is connected to the variable resistor 189. The movable contact 192 of the variable resistor 189 is connected to the line 179.

Operation of the apparatus of the present invention via the control circuit of FIG. 10 is initiated by closing the main switch 102 to energize the relay windings 105, 106 and 108 and the vertical, auxiliary and horizontal blowers or blower motors 65, 111 and 73. Energization of the relay windings 105, 106 and 108 closes the contacts of said relay windings, thereby energizing the horizontal and vertical heaters 73 and 65a, 65b. The thermostats 75, 68 and 107 function to control and maintain a determined operating temperature in the vertical and horizontal conduits 34 and 35. The lamp 114 of the AC control circuit 112 is energized due to the application of power to the input transformer 113. During the initial warm up period or during long stand by periods, the motor start switch 109 of the hot-air blower control circuit of FIG. 10 may be opened to deenergize the vertical blower 65, in order to reduce the quantity of hot air being provided in the operating area of the apparatus.

The AC control circuit 112 is energized via the circuit breaker 117. The lamp 118 is energized when the circuit breaker 117 is closed and indicates that the apparatus is ready for operation. The film-wrapped pallet load 12 is on the rotary platform 15, as hereinbefore described, due to the initial part of the method of the present invention, which involves wrapping said pallet load in film. The pushbutton 152 on the console 88 is pressed and causes the energization of the relay 149 winding and the solenoid 153. The energized relay 149 closes its contacts 149A. The energized solenoid 153 actuates two air cylinders (not shown in the FIGS.) each of which raises or rotates upward the corresponding one of the first and second bridge members 17 and 18.

When the pushbutton 124 on the console 88 is pressed, the relay 119 winding is energized, thereby energizing the control circuit by closing its contacts 119A, opening its contacts 119B and closing its contacts 119C. Closing of the contacts 119A short circuits the lamp 128, so that said lamp is deenergized.

When the pushbuttons 132 and 135, which are operated together, are pressed, the wrapping rotation cycle is instituted. The relay 131 winding is energized and closes its contacts 131A, closes its contacts 131B, closes its contacts 131C and and closes its contacts 131D. When the contacts 131D of the relay 131 are closed, the armature circuit of the rotary drive motor 24 is energized and said motor rotates the rotary platform 15 about its axis.

After a brief rotation of the rotary platform 15, the normally closed, held open limit switch 137 is released, thereby energizing the relay 134 and 136 windings. When the relay 134 is energized, it closes its contacts 134A, closes its contacts 134B, closes its contacts 134C, opens its contacts 134D, closes its contacts 134E, opens its contacts 134F and opens its contacts 134G. The closed contacts 134B and the closed contacts 131C in series therewith energize the relay 133 winding in series therewith. When the relay 133 is energized, it opens its contacts 133A and closes its contacts 133B.

After the rotary platform 15 has been rotated 360°, the normally closed, held open limit switch 137 is again actuated, thereby deenergizing the relays 134 and 136. When the relay 134 is deenergized, the relay 133 is deenergized by the opening of the contacts 134B. The relay 131 is deenergized by the actuation of the limit switch 137. The rotary drive motor 24 is deenergized by the opening of the contacts 131D of the relay 131. The apparatus is then ready for the shrinking operation.

The pushbutton 139, which is the vertical conduit forward switch, is pressed, thereby energizing the relay 138 winding. When the relay 138 is energized, it closes its contacts 138A and 138B. When the contacts 138A and the switch 141 are closed, the relay 138 is locked in energized condition. The switch 141 is the vertical conduit back limit switch. When the contacts 138B are closed, the relay 142 winding is energized and closes its contacts 142A, thereby preparing the armature circuit of the vertical conduit drive motor 46.

As long as the light beam to the photocell 87 is uninterrupted, the relay 145 winding is energized and opens its contacts 145A, closes its contacts 145B, closes its contacts 145C and opens its contacts 145D. The relay 144 winding is energized via the closed contacts 134C and 138B, thereby closing its contacts 144A, opening its contacts 144B, opening its contacts 144C and closing its contacts 144D. When the contacts 134F are closed and the contacts 145C are closed, the relay 164 winding is energized. Energization of the relay 164 causes its contacts 164A to close, thereby energizing the relay 158 winding.

When the relay 158 is energized it opens its contacts 158A, closes its contacts 158B, closes its contacts 158C and closes its contacts 158D. Closing of the contacts 158C and 158D closes the armature circuit of the vertical conduit drive motor 46. The motor 46 moves the vertical conduit 34 forward toward the pallet load 12. After the vertical conduit 34 is moved a short distance, the normally open, held closed limit switch 141 is released and deenergizes the relay 138. The normally closed, held open limit switch 143 locks the energizing circuit of the relay 142.

When the vertical conduit 34 reaches its determined limit distance from the pallet load 12, the light beam impinging upon the photocell 87 is interrupted by said pallet load and the relay 145 is deenergized. When the relay 145 is deenergized it opens its contacts 145C thereby deenergizing the relay 164. When the relay 164 is deenergized, it opens its contacts 164A, thereby deenergizing the relay 158 and stopping the operation of the vertical drive motor 46 in the forward direction. When the relay 145 is deenergized, its contacts 145D are closed, thereby energizing the relay 174 winding.

When the relay 174 is energized, it closes its contacts 174A, thereby energizing the relay 175 winding. When the relay 175 is energized, it closes its contacts 175B and 175D, thereby energizing the armature circuit of the vertical conduit drive motor 46 for rotation in the reverse direction. The motor 46 then moves the vertical conduit 34 backward, away from the pallet load 12, until the light beam again impinges upon the photocell 87.

When the light beam impinges upon the photocell 87, the relay 145 winding is energized, thereby closing its contacts 145B. The relay 146 winding is energized via the normally closed contacts 134D of the relay 134 and the normally closed contacts 144B of the relay 144. When the relay 146 is energized, it closes its contacts 146C, thereby energizing the relay 148. When the relay 148 is energized, it closes its contacts 148A, thereby closing the armature circuit of the rotary drive motor 24. The rotary drive motor 24 then rotates the rotary platform 15.

After the rotary platform 15 has been rotated briefly, the switch 137 is released thereby energizing the relay 134 winding. When the relay 134 is energized, it deenergizes the relay 146 by opening its contacts 134D. When the relay 146 is deenergized, it energizes the relay 148 by opening its contacts 146C. When the relay 134 is energized, it energizes the relay 144 winding by closing its contacts 134C. The rotary platform 15 is rotated for 360° by the rotary drive motor 24, while the vertical conduit 34 is moved back and forth by the vertical conduit drive motor 46 under the control of the relay 145 and the photocell 87.

When the rotary platform 15 turns corners, its rotary speed is decreased under the control of the limit switch 187 which functions as a corner detect limit switch. The corner detect limit switch 187 is opened, thereby adding additional resistance of the variable resistors 188 and 189 to the armature circuit of the rotary drive motor 24, so that the speed of said motor is decreased.

After the rotary platform 15 has rotated 360°, the normally closed, held open limit switch 137 is actuated and deenergizes the relay 134 winding. When the relay 134 is deenergized, it deenergizes the relay 148 by opening the contacts 134E. When the relay 148 is deenergized, it opens its contacts 148A, thereby deenergizing the rotary drive motor 24, so that said motor stops. When the relay 134 is deenergized, it energizes the relay 174 by closing the contacts 144 D and permitting the contacts 147A to remain closed due to the relay 147 winding being deenergized and the relay 144 winding being energized.

When the relay 174 winding is energized, it energizes the relay 175 winding by closing its contacts 174A. When the relay 175 winding is energized, it closes the reverse direction armature circuit of the vertical conduit drive motor 46. The vertical conduit 34 is then moved backward by the vertical conduit drive motor 46 until the limit switch 141 is abutted by the wheeled truck 29. When the normally open, held closed limit switch 141 is actuated, the normally closed, held open limit switch 143 is simultaneously actuated, thereby deenergizing the relay 142 winding. When the relay 142 is deenergized, it opens its contacts 142A, thereby deenergizing the vertical conduit drive motor 46 to stop the movement of the vertical conduit 34. The shrinking cycle is then completed. While the invention has been described by means of a specific example and in a specific embodiment, I do not wish to be limited thereto, for obvious modifications will occur to those skilled in the art without departing from the spirit and scope of the invention.

What I claim is:

1. Apparatus for wrapping an object, comprising: conveyor means for transporting an object, said conveyor means having a space formed therein dividing said conveyor means into two parts each having an edge bordering said space; rotary platform means rotatably mounted in the space between the two conveyor parts for axial rotation in a plane substantially coplanar with the plane of said conveyor means; said rotary platform means being positioned for transfer of the object from one of the two conveyor parts to said rotary platform means and for transfer of the object from said rotary platform means and for transfer of the object from said rotary platform means to the other of said two conveyor parts; a bridge member pivotally affixed to the edge of one of the parts of the conveyor means and extending into said space and bridge means coupled to said bridge member for selectively pivotally raising and lowering said bridge member to permit clearance of the corners of said rotary platform means and said edge during rotation of said rotary platform means; wrapping means for wrapping a heat-shrinkable film on the object; rotary drive means coupled to said rotary platform means for rotating the film-wrapped object on said rotary platform means; and shrinking means for heat shrinking the film around the object during rotation of said rotary platform means.

2. Apparatus as claimed in claim 1, wherein said wrapping means comprises a roll of heat-shrinkable film mounted adjacent said rotary platform means for wrapping the object on said rotary platform means during rotation of said rotary platform means.

3. Apparatus as claimed in claim 1, wherein said shrinking means comprises vertical conduit means having a substantially vertical conduit movably mounted for movement toward and away from said rotary platform means, said vertical conduit having a plurality of outlet apertures formed therethrough extending along the vertical length thereof, vertical heat means for blowing hot air out of said outlet apertures, and vertical conduit drive means coupled to said vertical conduit for selectively moving said vertical conduit toward and away from said rotary platform means.

4. Apparatus as claimed in claim 1, wherein said shrinking means further comprises horizontal conduit means having a substantially horizontal conduit movably mounted for movement upward and downward relative to the object on said rotary platform means, said horizontal conduit having a plurality of outlet apertures formed therethrough extending along a horizontal length thereof, horizontal heat means for blowing hot air out of said outlet apertures, and horizontal conduit drive means coupled to said horizontal conduit for selectively moving said horizontal conduit upward and downward.

5. Apparatus as claimed in claim 1, further comprising a second bridge member pivotally affixed to the edge of the other of the parts of the conveyor means and extending into said space, and bridge means coupled to said first and second bridge members for selectively pivotally raising and lowering said first and second bridge members to permit clearance of the corners of said rotary platform means and said edges during rotation of said rotary platform means.

6. Apparatus for shrink wrapping an object, comprising rotary platform means for rotating an object wrapped in a heat-shrinkable film; and shrinking means for heat shrinking the film around the object during rotation of said rotary platform means, said shrinking means comprises vertically extending conduit means having a substantially vertical conduit movably mounted for movement toward and away from said rotary platform means, said vertical conduit having air outlet means extending along at least part of the vertical length thereof, air heating and blowing means for blowing hot air out of said outlet means, and drive means coupled to said vertical conduit and to said air heating and blowing means for moving said vertical conduit and said air heating and blowing means toward and away from said rotary platform means, and control means electrically connected to the vertical conduit drive means for deenergizing said vertical conduit drive means when said vertical conduit reaches a determined distance from said object.

7. Apparatus as claimed in claim 5, wherein the object is a pallet load.

8. Apparatus for shrink wrapping an object, comprising rotary platform means for rotating an object wrapped in a heat-shrinkable film; and shrinking means for heat shrinking the film around the object during rotation of said rotary platform means, said shrinking means comprises vertically extending conduit means having a substantially vertical conduit movably mounted for movement toward and away from said rotary platform means, said vertical conduit having air outlet means extending along at least part of the vertical length thereof, air heating and blowing means for blowing hot air out of said outlet means, and drive means coupled to said vertical conduit and to said air heating and blowing means for moving said vertical conduit and said air heating and blowing means toward and away from said rotary platform means, and a conveyor having a retractable part disposed adjacent said rotary platform means and movable to a retracted position when said rotary platform is rotated with the load thereon.